US012700932B2

(12) United States Patent
Mutangana et al.

(10) Patent No.: US 12,700,932 B2
(45) Date of Patent: Aug. 4, 2026

(54) AUTOMATIC WIRELESS VEHICLE ANCHOR CORRECTION

(71) Applicant: Ford Global Technologies, LLC, Dearborn, MI (US)

(72) Inventors: Jean de Dieu Mutangana, Detroit, MI (US); Ivan Vukovic, Birmingham, MI (US); Nicholas Alexander Scheufler, Flat Rock, MI (US); Sathyanarayana Chary Palakonda, Northville, MI (US); Sanketh Venkatesh Prasad, Bloomington, IL (US)

(73) Assignee: Ford Global Technologies, LLC, Dearborn, MI (US)

( * ) Notice: Subject to any disclaimer, the term of this patent is extended or adjusted under 35 U.S.C. 154(b) by 280 days.

(21) Appl. No.: 18/658,109

(22) Filed: May 8, 2024

(65) Prior Publication Data

US 2025/0350382 A1     Nov. 13, 2025

(51) Int. Cl.
| | |
|---|---|
| *H04B 17/318* | (2015.01) |
| *B60R 25/10* | (2013.01) |
| *B60R 25/31* | (2013.01) |
| *H04B 17/21* | (2015.01) |
| *H04W 4/029* | (2018.01) |

(52) U.S. Cl.
CPC ....... *H04B 17/318* (2015.01); *B60R 25/1004* (2013.01); *B60R 25/31* (2013.01); *B60R 2325/205* (2013.01)

(58) Field of Classification Search
CPC ....... H04W 64/00; H04W 4/33; H04W 4/023; H04W 4/02; H04W 4/80; H04W 24/02; H04W 4/025; H04W 8/22; H04W 4/021; H04W 4/029; H04W 4/30; H04W 64/003
See application file for complete search history.

(56) References Cited

U.S. PATENT DOCUMENTS

| | | | |
|---|---|---|---|
| 7,541,968 | B2 | 6/2009 | Hall et al. |
| 9,030,321 | B2 | 5/2015 | Breed |
| 9,166,730 | B2 | 10/2015 | Van Wiemeersch |
(Continued)

FOREIGN PATENT DOCUMENTS

| | | | |
|---|---|---|---|
| CN | 115366845 | A | 11/2022 |
| CN | 115412919 | A | 11/2022 |
(Continued)

*Primary Examiner* — Sai Aung
(74) *Attorney, Agent, or Firm* — Joseph Zane; Brooks Kushman P.C.

(57) ABSTRACT

Detection and correction of obstruction of vehicle wireless anchor points within a vehicle is performed. A wireless environment of a cabin of the vehicle is characterized using one or more ultra-wideband (UWB) transceivers of a phone-as-a-key (PaaK) system of the vehicle, the characterizing including to compute an initial characterization of paths and signal strength between a transmitter and a receiver of the one or more UWB transceivers. The wireless environment is periodically remeasured to compute an updated characterization of the paths and the signal strengths. Responsive to changes in the wireless environment as compared to the initial characterization indicating an impairment of in-cabin presence features, the impairment is remedied by switching which of the one or more UWB transceivers are used to perform the characterizing.

20 Claims, 8 Drawing Sheets

(56)　　　　　References Cited

U.S. PATENT DOCUMENTS

| | | | |
|---|---|---|---|
| 10,730,479 B2 | 8/2020 | Golsch | |
| 11,740,342 B2 | 8/2023 | Eber et al. | |
| 11,740,343 B2 | 8/2023 | Eber et al. | |
| 2020/0196094 A1* | 6/2020 | Smith | H04W 4/40 |
| 2020/0196095 A1* | 6/2020 | Smith | H04B 17/27 |
| 2020/0196098 A1* | 6/2020 | Smith | H04B 17/27 |
| 2020/0406860 A1 | 12/2020 | Mai et al. | |
| 2022/0044504 A1 | 2/2022 | Consolacion et al. | |
| 2024/0080149 A1* | 3/2024 | Duan | H04W 72/23 |
| 2024/0235712 A1* | 7/2024 | Reisinger | H04W 56/0015 |
| 2024/0319351 A1* | 9/2024 | Jang | G01S 5/12 |
| 2024/0393470 A1* | 11/2024 | Jayaram | G01S 19/08 |
| 2025/0056475 A1* | 2/2025 | Ji | G01S 5/0244 |
| 2025/0208251 A1* | 6/2025 | Golsch | G01S 5/0284 |
| 2025/0296574 A1* | 9/2025 | Han | B60W 40/08 |

FOREIGN PATENT DOCUMENTS

| | | | |
|---|---|---|---|
| DE | 102020101732 A1 | 7/2021 | |
| DE | 102021100160 A1 | 7/2021 | |
| DE | 102021102159 A1 | 8/2021 | |
| DE | 102023102371 A1 | 8/2023 | |
| JP | 6988986 B2 | 1/2022 | |

* cited by examiner

100

104c

104b

104e

104f

106

108

Controller

104d

104a

104g

Mobile Device
110

Vehicle
102

700

START

702
Handshake Tx / Rx

704
Characterize Initial Wireless Environment of Vehicle Cabin

706
Perform Cycle?

NO

YES

708
Characterize Current Wireless Environment of Vehicle Cabin

710
Impairment Detected

YES

NO

712
Utilize Tx / Rx to Perform Presence Features

714
Remedy Impairment Condition

800

808

Network Device

812

Input Device

804

Processor

810

Output Device

806

Storage

Computing Device
802

AUTOMATIC WIRELESS VEHICLE ANCHOR CORRECTION

TECHNICAL FIELD

Aspects of the disclosure relate to detection and correction of issues with vehicle wireless anchor points.

BACKGROUND

Some vehicles may be unlocked or started with a digital key. A digital key, sometimes implemented with a smartphone (e.g., phone-as-a-key), relies on communication between a mobile device such as a smartphone and the vehicle. When an application is activated on the mobile device and the mobile device is held at a particular location relative to the vehicle, such as next to the door handle, the vehicle unlocks the doors. A digital key may communicate with the vehicle using Bluetooth®, near field communication (NFC), and/or ultra-wideband (UWB).

SUMMARY

In one or more illustrative examples, a method for implementing detection and correction of obstruction of vehicle wireless anchor points within a vehicle includes characterizing a wireless environment of a cabin of the vehicle using one or more ultra-wideband (UWB) anchors of a phone-as-a-key (PaaK) system of the vehicle, the characterizing including to compute an initial characterization of paths and signal strengths between a transmitter and a receiver of the one or more UWB anchors; periodically remeasuring the wireless environment to compute an updated characterization of the paths and the signal strengths; and responsive to changes in the wireless environment as compared to the initial characterization indicating an impairment of in-cabin presence features, remedying the impairment by switching which of the one or more UWB anchors are used to perform the characterizing.

In one or more illustrative examples, a system for detection and correction of obstruction of vehicle wireless anchor points within a vehicle includes one or more UWB anchors and a controller in communication with the one or more UWB anchors. The controller is configured to perform a handshake operation between a first UWB anchor of the one or more UWB anchors and a second UWB anchor of the one or more UWB anchors to establish visibility between the one or more UWB anchors, characterize a wireless environment of a cabin of the vehicle using the one or more UWB anchors, the characterization including to compute an initial characterization of paths and signal strengths between a transmitter and a receiver of the one or more UWB anchors, periodically remeasure the wireless environment to compute an updated characterization of the paths and the signal strengths, and responsive to changes in the wireless environment as compared to the initial characterization indicating an impairment of in-cabin presence features, remedy the impairment by switching which of the one or more UWB anchors are used to perform the characterization.

In one or more illustrative examples, a non-transitory computer-readable medium includes instructions for detection and correction of obstruction of vehicle wireless anchor points of a PaaK system of a vehicle that, when executed by a controller in communication with one or more UWB transceivers, causes the controller to perform operations including to perform a handshake operation between a first UWB transceiver of the one or more UWB transceivers and a second UWB transceiver of the one or more UWB transceivers to establish visibility between the one or more UWB transceivers for an initial characterization of a cabin of the vehicle, utilize a transmitter and a receiver of the one or more UWB transceivers for performing in-cabin presence features, including one or more of intrusion detection or child presence detection within the cabin, characterize a wireless environment of the cabin of the vehicle using one or more UWB transceivers, the characterization including to compute an initial characterization of paths and signal strengths between the transmitter and the receiver of the one or more UWB transceivers, periodically remeasure the wireless environment to compute an updated characterization of the paths and the signal strengths, responsive to changes in the wireless environment as compared to the initial characterization indicating an impairment of the in-cabin presence features, remedy the impairment by switching which of the one or more UWB transceivers are used to perform the characterization.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

UWB is a radio access technology (RAT) that is becoming prevalent in both smartphones and vehicles. It may be used in various vehicle architectures as part of a digital key system, such as phone-as-a-key (PaaK), either alone or in combination with Bluetooth Low Energy (BLE) to accurately locate the user device and to lower the risk of playback attacks.

To perform localization of a user device for PaaK, the vehicle may include several exterior and interior UWB anchors. This may include UWB anchor devices near each vehicle corner as well as additional UWB devices anchored inside the vehicle roof, such as one near the sunglass box near the front of vehicle's roof and near the center console between the passenger and the driver in combination with BLE sensors.

Presence features, such as intrusion detection or child presence detection, may take advantage of the UWB anchors of the PaaK system. These presence features may rely on the state of communication channel between interior UWB anchors to determine if there is presence of an obstruction within the vehicle cabin. This may be accomplished by measuring wireless channel characteristics between the UWB anchors. However, this communication channel between UWB anchors may be impaired by placement of metallic objects in proximity to the UWB anchors. Such an obstruction may render communication impossible, thereby rendering the presence features inoperative.

Aspects of the disclosure relate to detecting such obstructions, as well as techniques to mitigate such obstructions. In one example, the vehicle may characterize the channel environment using the interior UWB anchors. If the channel environment remains stable, then the vehicle may infer that the vehicle presence features are operative. If, however, the vehicle detects that there has been a disturbance in the channel environment, the vehicle may change which of the UWB anchors are used to characterize the channel environment, to find a replacement pairing to continue to allow the presence features to operate. In such a situation, the vehicle may also the vehicle may sound alarms, flash lights, etc., to ward off an intruder. In another example, the vehicle may send a message to the vehicle owner or operator to alert the owner or operator of the potential issue.

Figure 1:
FIG. 1 illustrates an example system implementing detection and correction of obstruction of vehicle wireless anchor points.

FIG. 1 illustrates an example system 100 including a vehicle 102 implementing detection and correction of obstruction of vehicle wireless anchor points. As shown, the vehicle 102 includes a plurality of UWB anchors 104, a transceiver 106, and a controller 108. The system 100 may be used to track the position of mobile devices 110. The mobile devices 110 may include smartphones, smart tools, smart watches, key fobs and/or other devices of interest.

Referring more specifically to FIG. 1, the vehicle 102 may be any passenger or commercial automobile such as a car, a truck, a sport utility vehicle, a crossover, a van, a minivan, a taxi, a bus, etc. The vehicle 102 may include various types of automobile, crossover utility vehicle (CUV), sport utility vehicle (SUV), truck, recreational vehicle, motorcycle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle.

The UWB anchors 104 communicate wirelessly with the mobile device 110 using radio waves. The UWB anchors 104 use an ultra-wideband signal, e.g., a signal with a low energy level spread over a large range of the radio spectrum. The Federal Communications Commission and the International Telecommunications Union Radiocommunication Sector define ultra-wideband as an antenna transmission for which emitted signal bandwidth exceeds the lesser of 500 MHz or 20% of the arithmetic center frequency. The UWB anchors 104 may use any suitable modulation method, e.g., orthogonal frequency-division multiplexing (OFDM), phase-shift keying (PSK), pulse-position modulation (PPM), etc.

To enable robust user localization, the vehicle is equipped with UWB responders that are strategically positioned in the vehicle's interior and within the body structure to provide UWB network coverage of the environment in and around the vehicle, i.e., where the mobile device 110 of the user may be located. Depending on the physical design and shape of the vehicle 102, some of the UWB anchors 104 may be placed inside the body walls of the vehicle 102 (e.g., four respectively placed near or/at each corner of the vehicle's front and rear bumpers), center console (between the driver and passenger seats) and inside the roof (near the rear center).

As shown in the example of FIG. 1, seven UWB anchors 104 are shown. These include a first UWB anchor 104a, a second UWB anchor 104b, a third UWB anchor 104c, a fourth UWB anchor 104d, a fifth UWB anchor 104e, a sixth UWB anchor 104f, and a seventh UWB anchor 104g. The UWB anchors 104 are spaced apart from each other, e.g., spread over the vehicle 102, to increase the ability to distinguish a location when used for trilateration. For example, four of the UWB anchors 104 may be located at respective corners of the vehicle 102 to maximize the horizontal spread of the UWB anchors 104, and the remaining three UWB anchors 104 may be located internally to a footprint of the vehicle 102 at different heights than the corner-mounted UWB anchors 104 to provide a vertical spread. To perform trilateration, computation of the intersection of three or more circles or spheres, may provide the location of the detected device.

The transceiver 106 may be adapted to transmit signals wirelessly through a different communication protocol than what is used by the UWB anchors 104, such as cellular, Bluetooth®, BLE, WiFi, Institute of Electrical and Electronics Engineer (IEEE) standard 802.11a/b/g/p, cellular-V2X (CV2X), Dedicated Short-Range Communications (DSRC), etc. The transceiver 106 is adapted to communicate using a protocol that is also used by the mobile device 110. In particular, the transceiver 106 may use BLE. The transceiver 106 may be one device or may include a separate transmitter and receiver.

The controller 108 may be a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The controller 108 can thus include a processor, a memory, etc. The memory of the controller 108 can include media for storing instructions executable by the processor as well as for electronically storing data and/or databases, and/or the controller 108 can include structures such as the foregoing by which programming is provided. The controller 108 can be multiple computers coupled together.

The controller 108 may transmit and receive data through a communications network such as a controller area network (CAN) bus, Ethernet, WiFi, Local Interconnect Network (LIN), onboard diagnostics connector (OBD-II), and/or by any other wired or wireless communications network. The controller 108 may be communicatively coupled to the UWB anchors 104, a transceiver 106, and other components via the communications network. The controller 108 may localize the position of the mobile device 110 using trilateration, based on the distance information collected between each of the UWB anchors 104 and the mobile device 110.

The UWB anchors 104 and the transceiver 106 may communicate with at least one mobile device 110. The mobile devices 110 may include portable computing devices such as smart keyfobs; mobile phones, e.g., smartphones; wearable devices, e.g., smartwatches, headsets, etc.; tablets; smart tools, etc. The mobile devices 110 are computing devices including respective processors and respective memories. The mobile devices 110 may be owned and carried by respective persons who may be operators and/or owners of the vehicle 102.

To perform the trilateration, a computation of the intersection of three or more circles or spheres may be performed. The UWB anchors 104 may be configured to transmit and receive signals (within signal power thresholds) over UWB channel frequencies (e.g., UWB channel 9 (7.737-8.236 GHz) to Channel 5 (6.240-6.739 GHz) or other possible channels that are adopted by the UWB standard). Under ideal radio frequency (RF) conditions, e.g., when the mobile device 110 is located within the line of sight (LOS), three UWB anchors 104 may be sufficient in locating the mobile device 110, i.e., the initiator, and thereby enabling trilateration-based localization of the user through responder-to-initiator distance ranging. However, because of the possibility of less favorable RF conditions, data from more than three UWB anchors 104 may be utilized by the controller 108 to ensure there is adequate wireless UWB coverage to locate the mobile device 110.

In addition to for use in PaaK, the controller 108 may also use the UWB anchors 104 to perform various presence features. These presence features may include intrusion detection or child presence detection. This may be accomplished through measurement of wireless channel characteristics between interior transmit and receive UWB anchors 104.

For example, channel impulse response (CIR) may be used between the UWB anchors 104 to characterize the wireless environment of the vehicle 102. The CIR may describe how a wireless channel responds to an impulse signal, which is a very short and high-energy signal. The CIR captures the amplitude, phase, and delay of the multipath components that are sent from a transmitter and received by a receiver after reflecting, refracting, or scattering within the environment. By observing the multipath components of the CIR caused by scattering at target objects, movement of humans within the vehicle 102 may be detected.

Significantly, the presence features rely on the state of communication channel between interior UWB anchors 104 to determine if there is presence or an obstruction within the vehicle cabin. However, this communication channel between UWB anchors 104 may be impaired by placement of metallic objects in proximity to the UWB anchors 104. Such an obstruction may render communication impossible, thereby rendering the presence features inoperative.

Figure 2:
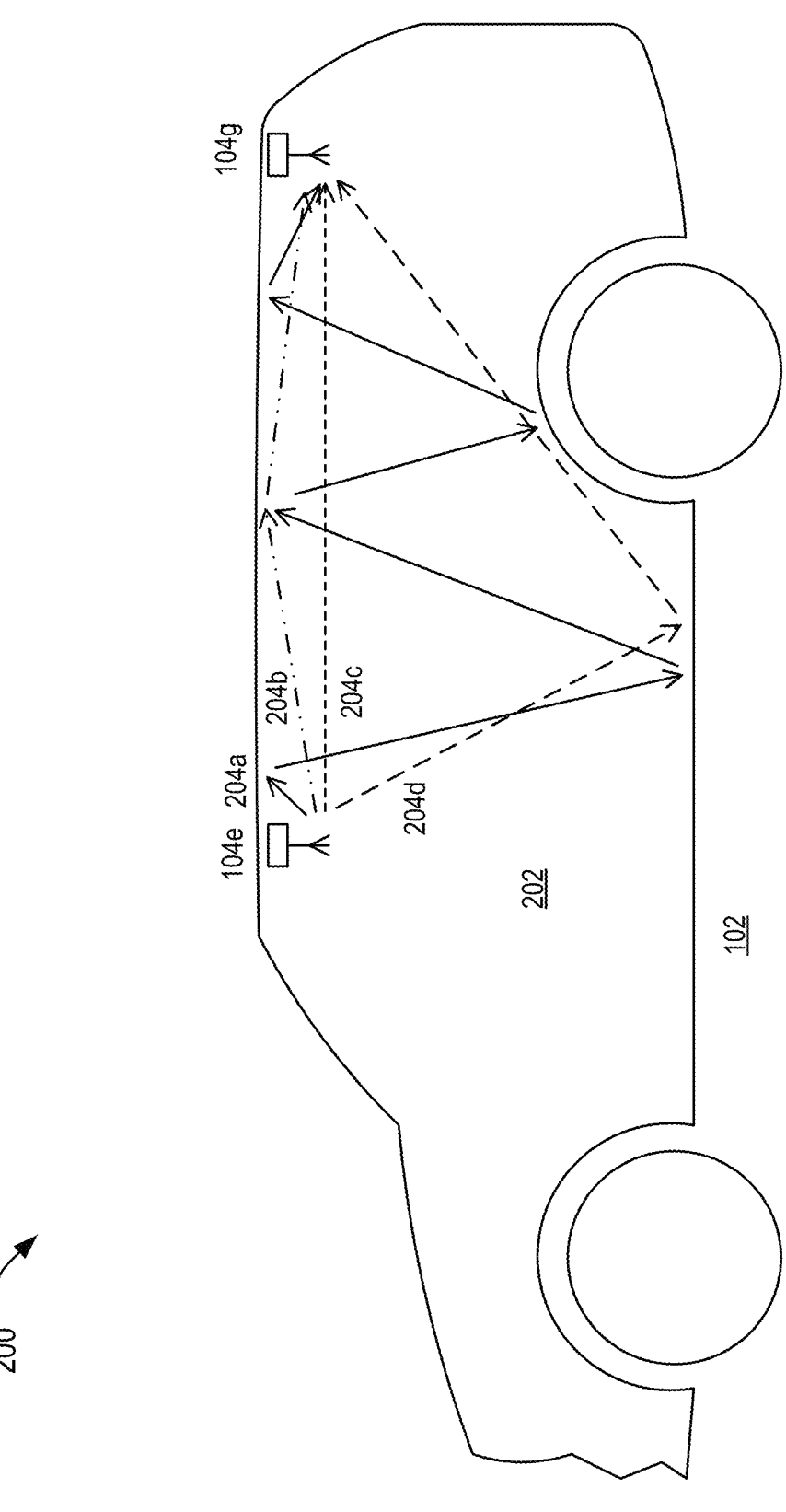
FIG. 2 illustrates an example of a characterization of the wireless channel characteristics within the cabin of the vehicle.

FIG. 2 illustrates an example of a characterization 200 of the wireless channel characteristics within the cabin 202 of the vehicle 102. As shown, a plurality of wireless paths 204 are available between an example pair of UWB anchors 104 within the cabin 202. In the illustration, the example pair is UWB anchor 104e in the roof closer to the front of the cabin 202 and UWB anchor 104g also in the roof but closer to the rear of the cabin 202. The example plurality of wireless paths 204 as shown include a first path 204a, a second path 204b, a third path 204c, and a fourth path 204d. In general, line of sight (LoS) and reflected signal paths 204 collectively indicate the characteristics of the wireless channel environment between the transmitter (Tx) and the receiver (Rx).

It should be noted that these paths 204 are examples, and many such paths 204 between the UWB anchors 104e, 104g are possible. It should also be noted that while the UWB anchor 104e is used as a Tx and the UWB anchor 104g is used as a Rx, in other examples, the UWB anchor 104g may be used as the Tx and the UWB anchor 104e may be used as the Rx.

To operate the presence features, such as to detect an intrusion into the cabin 202, the controller 108 may utilize the UWB anchor 104 working as the Rx to characterize the wireless channel characteristics measurements between the UWB anchor 104 Rx and the UWB anchor 104 being used as the Tx. This characterization may be performed by the controller 108 at an initial time, such as the time at which the vehicle 102 is locked and/or the user leaves the vehicle 102. This initial time may be referred to as to.

The characterization may include capturing information about the wireless environment within the cabin 202 of the vehicle 102, such as the number of signal paths 204, the strengths of the signals via each of the path 204, angles of arrival of the paths 204, etc.). For example, the controller 108 may infer the quantity of paths 204 based on the timing of multiple received signals at the Rx based on transmission of a wireless pulse from the Tx. In addition, for each path 204, the controller 108 may record the received signal strength information (RSSI). It should be noted that the contours of each of the paths 204 is irrelevant to the controller 108 for the characterization.

After the characterization performed at to, the controller 108 may continue to utilize the UWB anchor 104 Tx and the UWB anchor 104 to measure the wireless environment within the cabin 202 of the vehicle 102. For example, the controller 108 pay periodically capture the same information about the capturing information periodically at times such as at $t_1, t_2, \ldots t_n$.

The controller 108 may compare the captured information at the later times $t_1, t_2, \ldots t_n$ to the wireless information captured at $t_0$ to see if a possible change in these characteristics occurs. If change is detected, it may indicate that there has been a disturbance in the channel environment such as an intrusion into the cabin 202. If no change has been detected, the controller 108 may continue periodically checking (at a fixed interval t=N milliseconds) if signal channel characteristics still match the original measurements.

Figure 3:
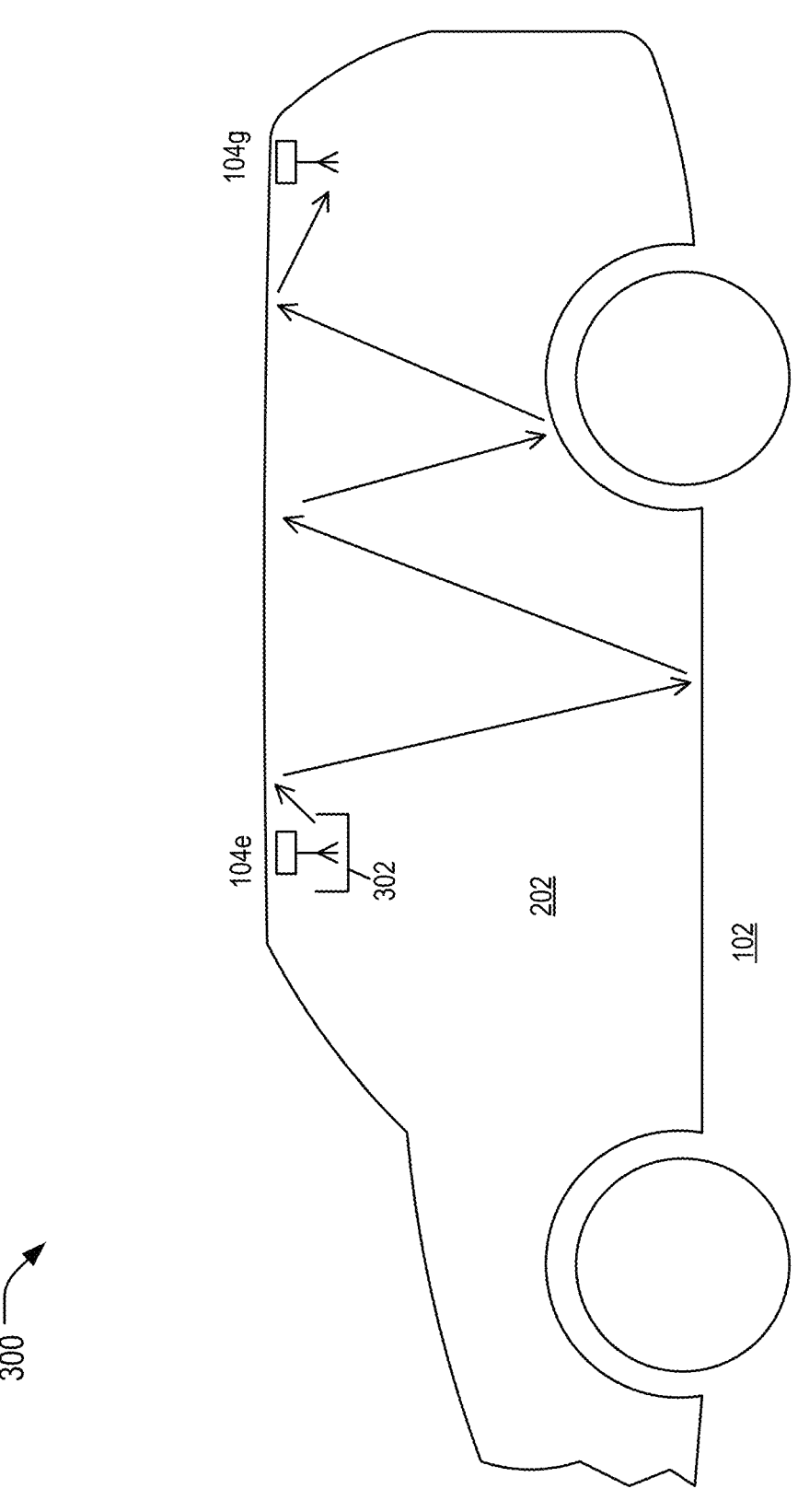
FIG. 3 illustrates an example detecting of an obstruction based on the wireless channel characteristics within the cabin of the vehicle.

FIG. 3 illustrates an example detecting 300 of an obstruction 302 based on the wireless channel characteristics within the cabin 202 of the vehicle 102. As shown, again the UWB anchor 104e is used as Tx and the UWB anchor 104g is used as Rx. However, in FIG. 3 the UWB anchor 104e is now partially covered by the obstruction 302. The obstruction 302 may be a metallic cover placed over the Tx to block it from sending signal to the Rx. While not shown in FIG. 3, in another example the obstruction 302 may instead be placed over the Rx to prevent it from receiving signal. Regardless, due to the presence of the obstruction 302 between the Tx and the Rx, the paths 202 between the UWB anchor 104e and the UWB anchor 104g are more limited than they are in FIG. 2.

The controller 108 may compare the captured information at the later times $t_1$, $t_2$, . . . $t_n$ to the wireless information captures at $t_0$ in FIG. 2. As the captured information now indicates fewer paths 202 and/or reduced RSSI along the paths 202, this may indicate to the controller 108 that there has been a disturbance in the channel environment. This may be indicative of the presence of the obstruction 302 (e.g., tampering to disable the presence functions of the vehicle 102). As some other examples, a change in the captured information may also indicate other issues unrelated to intentional tampering, such as a malfunction of the Tx, a malfunction of the Rx, the settling of objects within the cabin 202, etc.

To address the obstruction 302, the controller 108 may sound an alarm of the vehicle 102, may flash the lights of the vehicle 102, etc., to ward off an intruder. In another example, the vehicle may send a message to the vehicle owner or operator to alert the owner or operator of the potential issue.

Figure 4:
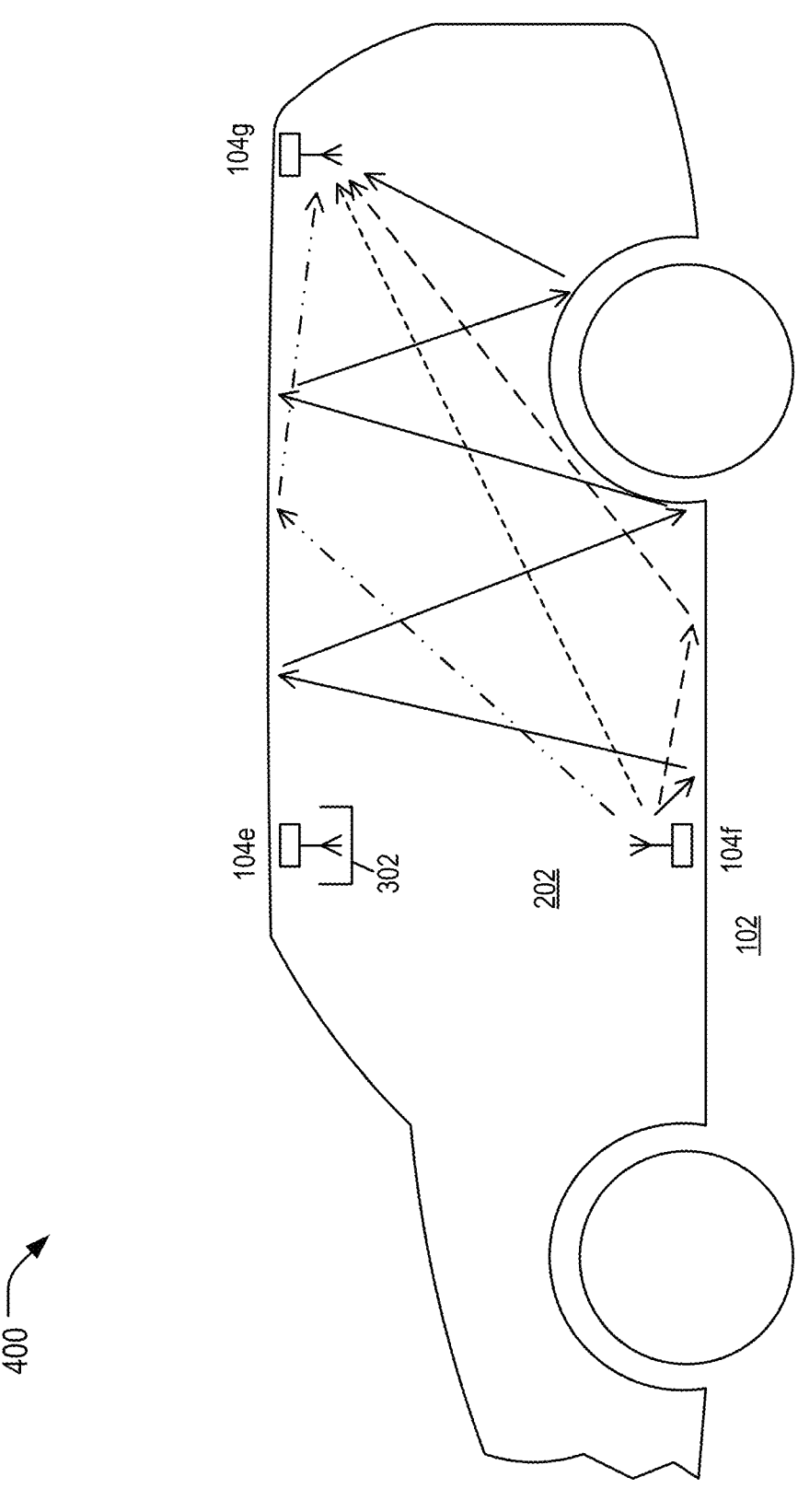
FIG. 4 illustrates an example of mitigating of the obstruction of the wireless channel characteristics within the cabin of the vehicle.

FIG. 4 illustrates an example of mitigating 400 of the obstruction 302 of the wireless channel characteristics within the cabin 202 of the vehicle 102. Here again, the UWB anchor 104e is now partially covered by the obstruction 302. However, additionally, the UWB anchor 104f is available to the controller 108. In this situation, and to address the obstruction 302, the controller 108 may swap use of the obstructed UWB anchor 104e for the unobstructed inactive UWB anchor 104f. Because the UWB anchor 104f is unobstructed, the ability to capture paths 202 between the Tx and the Rx is restored.

Figure 5:
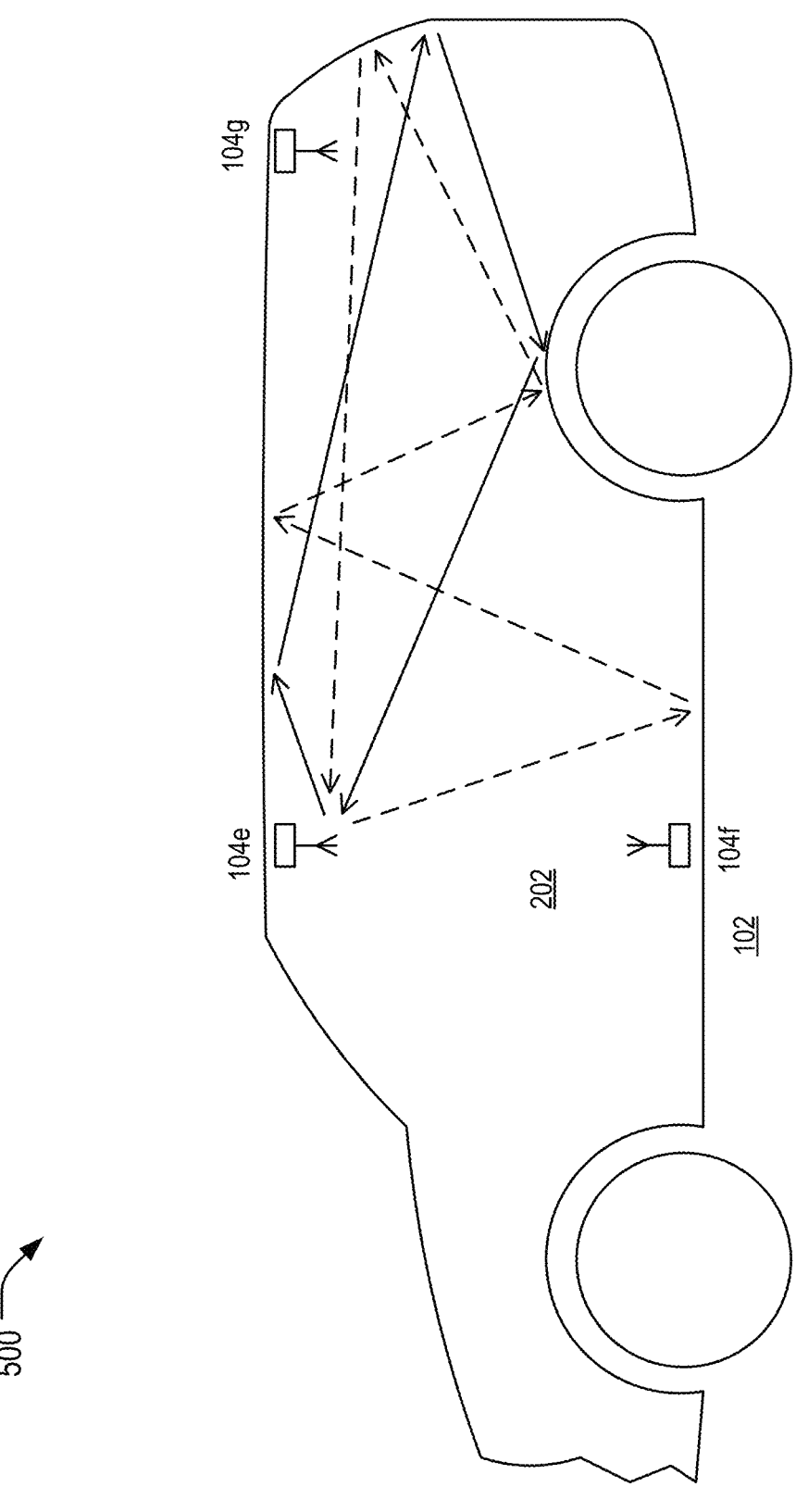
FIG. 5 illustrates an example of use of a single multiple antenna UWB anchor for measuring the wireless channel characteristics within the cabin of the vehicle.

FIG. 5 illustrates an example of use of a single multiple antenna UWB anchor 104 for measuring the wireless channel characteristics within the cabin 202 of the vehicle 102. As shown, the UWB anchor 104e is a multiple antenna device. Thus, the UWB anchor 104e can serve for measuring the wireless channel characteristics by having one of its antennas act as the Tx and the other antenna act as the receiver Rx.

Similar to the single antenna approaches, in a multiple antenna UWB anchor 104 implementation, the controller 108 may utilize a single multiple antenna UWB anchor 104 to characterize the wireless channel characteristics measurements at an initial time to, such as the time at which the vehicle 102 is locked and/or the user leaves the vehicle 102. The controller 108 may similarly use the single multiple antenna UWB anchor 104 to compare the captured information at the later times $t_1$, $t_2$, . . . $t_n$ to the wireless information captured at to. If the comparison indicates an obstruction of the multiple antenna UWB anchor 104, then an alert may be raised and/or different UWB anchors 104 may be substituted in.

It should also be noted that, although a single multiple antenna UWB anchor 104 is shown as performing the measurement, it may also be desirable to have the controller 108 implement a communication handshake between antenna UWB anchor 104e and another of the UWB anchors 104, e.g., UWB anchor 104f or UWB anchor 104g, in order to confirm (i) UWB anchor 104e is able to see other UWB anchors 104 at $t_0$, and (ii) that received signal strength levels at the UWB anchor 104e are above a desired threshold (e.g., to ensure that no tampering or breakdown has occurred at $t_0$). This determination of initial visibility of the UWB anchor 104e to other UWB anchors 104 within the cabin 202 may be performed at or before determining $t_0$, such as the time at which the vehicle 102 is locked and/or the user leaves the vehicle 102.

Figure 6:
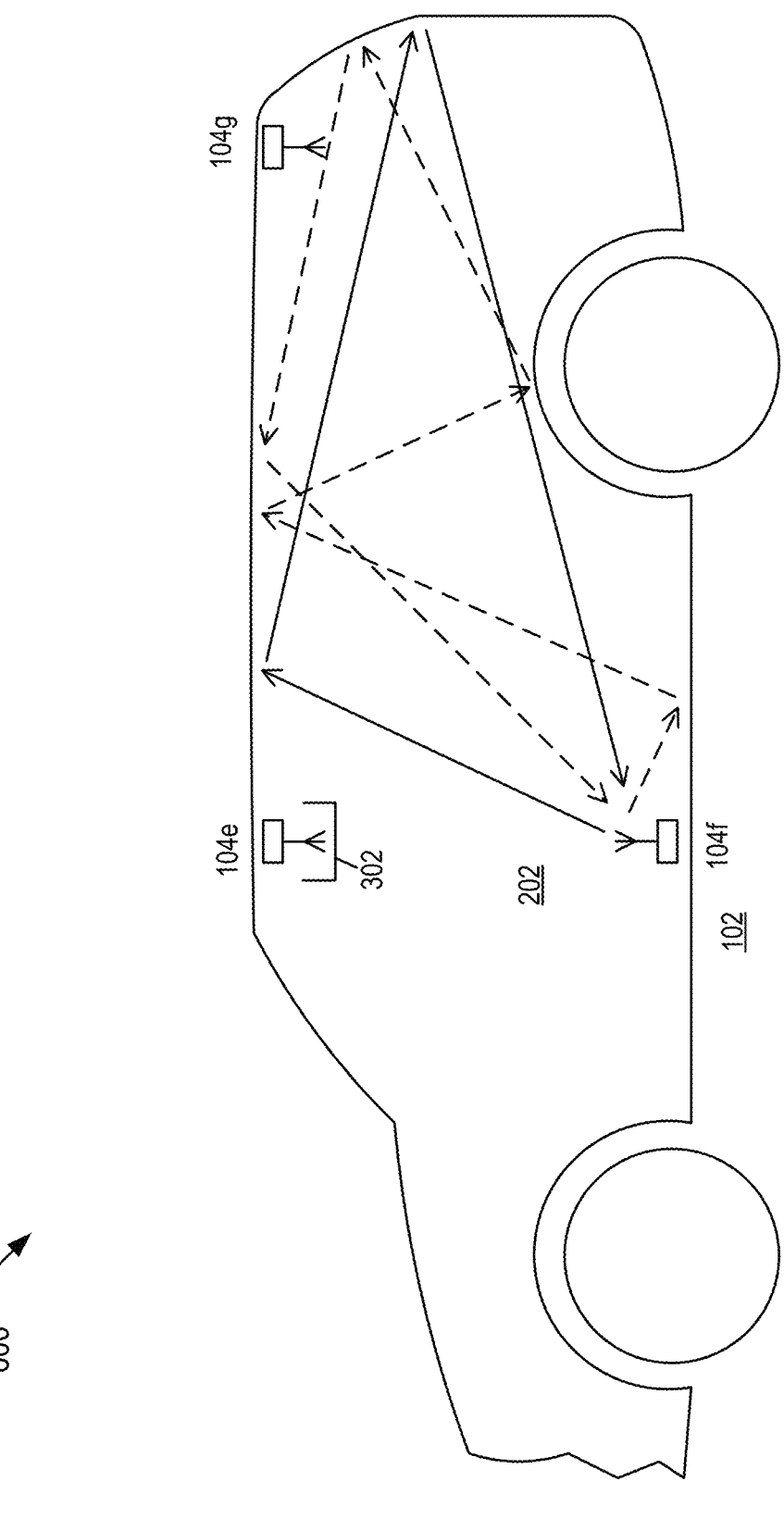
FIG. 6 illustrates an example of mitigating of the obstruction of the wireless channel characteristics within the cabin of the vehicle in the multiple antenna UWB anchor implementation.

FIG. 6 illustrates an example of mitigating 600 of the obstruction 302 of the wireless channel characteristics within the cabin 202 of the vehicle 102 in the multiple antenna UWB anchor 104 implementation. Here, the UWB anchor 104f has taken over both Tx and Rx operations from the blocked UWB anchor 104e.

Figure 7:
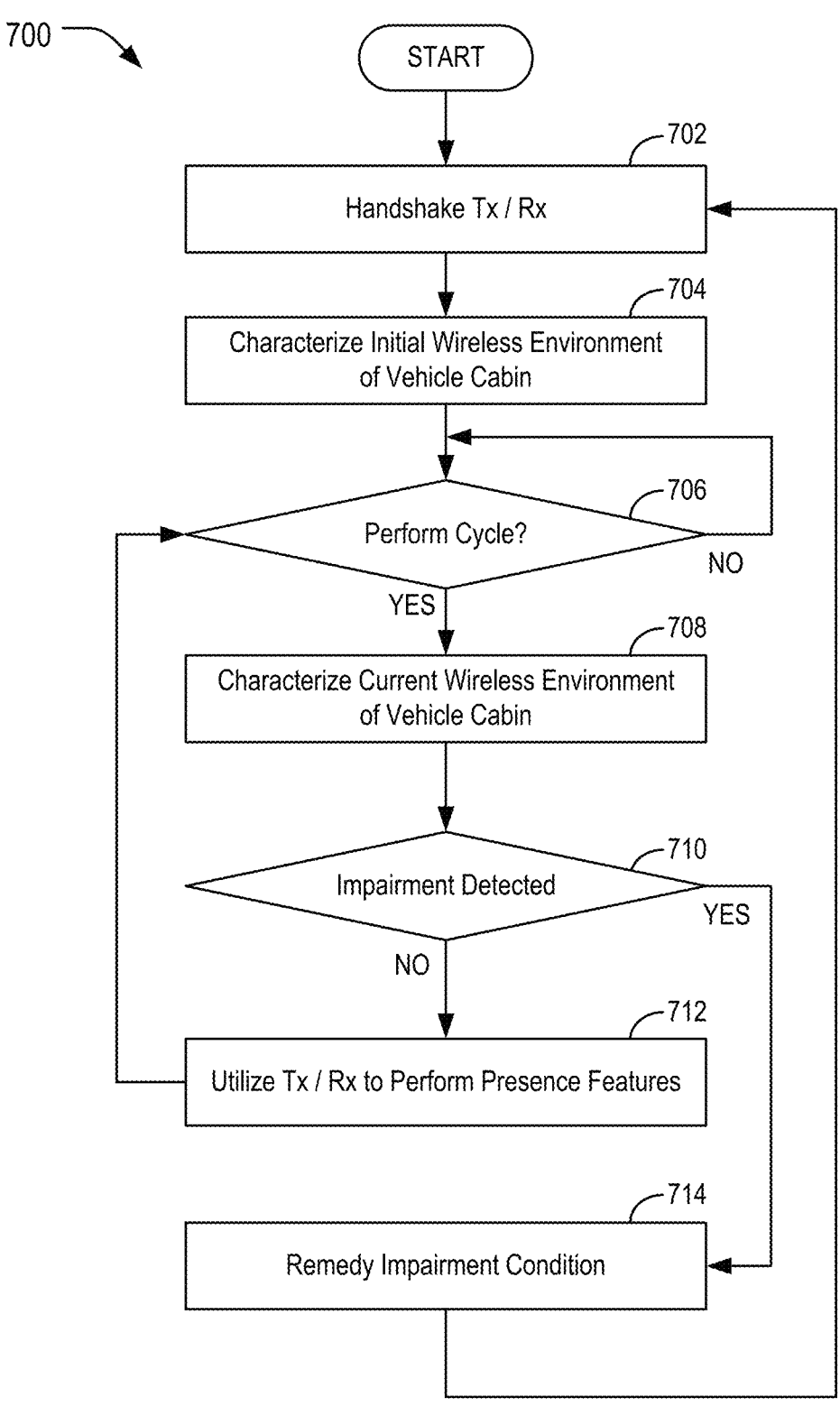
FIG. 7 illustrates an example process for implementing detection and correction of obstruction of vehicle wireless anchor points.

FIG. 7 illustrates an example process 700 for implementing detection and correction of obstruction of vehicle wireless anchor points such as UWB anchors 104. The UWB anchors 104 may be used by the vehicle 102 for the dual purposes of PaaK access, as well as presence features such as intrusion detection or child presence detection. In an example, the process 700 may be performed by the vehicle 102 using the controller 108 and single antenna and/or multiple antenna UWB anchors 104.

At operation 702, the controller 108 performs a handshake operation. In an example, the PaaK system of the vehicle 102 may include one or more UWB anchor 104. The controller 108 may perform the wireless handshake between a first UWB anchor 104 of the one or more UWB anchors 104 of and a second UWB anchor 104 of the one or more UWB anchors 104. This may be done to establish visibility between the one or more UWB anchors 104 for the initial characterization. For instance, if the two UWB anchors 104 can reliably perform data communications, then it can be assured by the controller 108 that the characterization would include paths 204 that traverse the cabin 202 of the vehicle 102 between the first and second UWB anchors 104. In an example, the Tx and the Rx may be implemented as a single multiple antenna UWB anchor 104 of the one or more UWB anchors 104 in the roof of the cabin 202 of the vehicle 102. In another example, the Tx is a first UWB anchor 104 of the one or more UWB anchors 104 in the roof of the cabin 202 of the vehicle 102, and the receiver is a second UWB anchor 104 of the one or more UWB anchors 104 in the roof of the cabin 202 of the vehicle 102.

At operation 704, the controller 108 characterizing an initial wireless environment. In an example, the controller 108 may utilize one or more of the ultra-wideband anchors 104, the characterizing including to compute an initial characterization of paths 204 and signal strengths along the paths 204 between the first UWB anchor 104 as Tx and the second UWB anchor 104 as Rx. For example, CIR may be used between the UWB anchors 104 to characterize the wireless environment of the vehicle 102. The CIR may describe how a wireless channel responds to an impulse signal, which is a very short and high-energy signal. The CIR captures the amplitude, phase, and delay of the multipath components that are sent from a transmitter and received by a receiver after reflecting, refracting, or scattering within the environment. This initial characterization may be maintained by the controller 108 as the initial wireless environment at time to.

At operation 706, the controller 108 determines whether it is time to perform the next operating cycle. In an example, the controller 108 may periodically perform the testing for obstructions and the presence detection features. If the period of time between cycles has elapsed, control continues to operation 708. Otherwise, control remains at operation 706.

At operation 708, the controller 108 characterizes the current wireless environment. In an example, the controller 108 may continue to utilize the UWB anchor 104 Tx and the UWB anchor 104 to measure the wireless environment within the cabin 202 of the vehicle 102. For example, the controller 108 pay periodically capture the same information about the capturing information periodically at times such as at $t_1, t_2, \ldots t_n$.

At operation 710, the controller 108 determines whether an impairment is detected. In an example, the controller 108 may compare the captured information at the later times $t_1$, $t_2, \ldots t_n$ to the wireless information captured at $t_0$ to see if a possible change in these characteristics occurs. In an example, the changes in the wireless environment indicating the impairment include signal strengths below a minimum threshold signal strength. Additionally or alternately, the changes in the wireless environment indicating the impairment include the quantity of paths being below a minimum threshold quantity of signal paths between the transmitter and the receiver. If no change has occurred, control proceeds to operation 712 to perform the presence detection features. If a chance has occurred, however, control proceeds to operation 714.

At operation 712, the controller 108 utilizes the one or more UWB anchors 104 to perform presence detection features. In an example, by observing the multipath components of the CIR caused by scattering at target objects, movement of humans within the vehicle 102 may be detected. After operation 712, control returns to operation 706 to await the next operation cycle.

At operation 714, the controller 108 remedies the impairment condition. In an example, the controller 108 may remedy the impairment by switching which of the one or more UWB anchors 104 are used to perform the characterizing. In another example, the controller 108 may additionally or alternately activate an alarm of the vehicle 102 in responsive to the changes in the wireless environment indicating an impairment of in-cabin presence features. In yet another example, may additionally or alternately send an alert to a mobile device of a user of the vehicle 102 in responsive to the changes in the wireless environment indicating an impairment of in-cabin presence features. After operation 714, control returns to operation 702. Or, if no updates to which of the one or more UWB anchors 104 are made, the process 700 may end (not shown).

Figure 8:
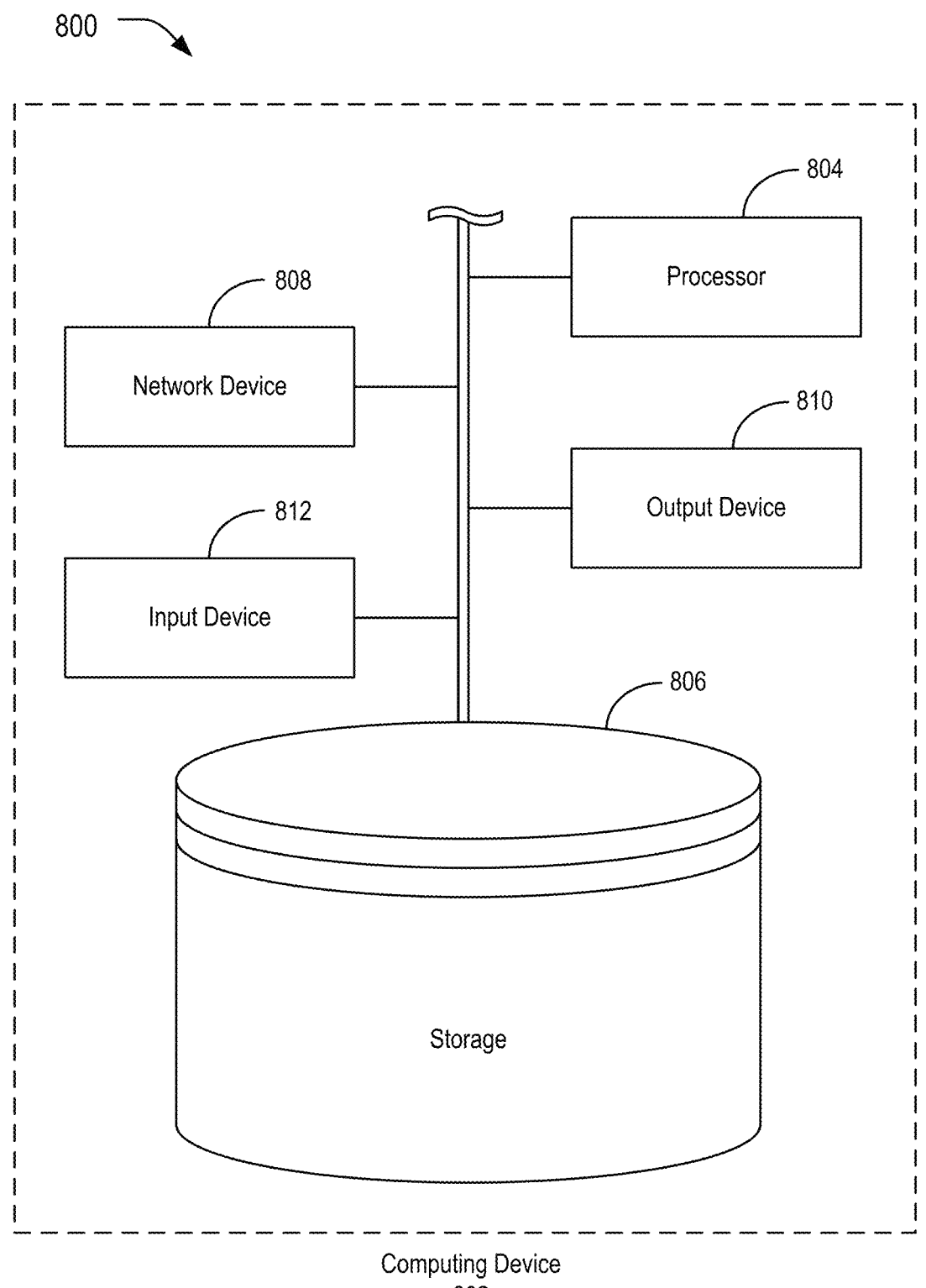
FIG. 8 illustrates an example computing device for implementing the improved tracking approach to selectively power down various of the UWB anchors to preserve energy of the vehicle.

FIG. 8 illustrates an example computing device 802 for implementing the improved tracking approach to selectively power down various of the UWB anchors 104 to preserve energy of the vehicle 102. Referring to FIG. 8, and with reference to FIGS. 1-7, the vehicle 102, UWB anchors 104, transceiver 106, controller 108, and mobile device 110 may be examples of such computing devices 802. Computing devices 802 generally include computer-executable instructions, where the instructions may be executable by one or more computing devices 802. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

As shown, the computing device 802 may include a processor 804 that is operatively connected to a storage 806, a network device 808, an output device 810, and an input device 812. It should be noted that this is merely an example, and computing devices 802 with more, fewer, or different components may be used.

The processor 804 may include one or more integrated circuits that implement the functionality of a central processing unit (CPU) and/or graphics processing unit (GPU). In some examples, the processors 804 are a system on a chip (SoC) that integrates the functionality of the CPU and GPU. The SoC may optionally include other components such as, for example, the storage 806 and the network device 808 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 804 executes stored program instructions that are retrieved from the storage 806. The stored program instructions, accordingly, include software that controls the operation of the processors 804 to perform the operations described herein. The storage 806 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 810. The output device 810 may include a graphical or visual display device, such as an electronic display screen, projector, printer, or any other suitable device that reproduces a graphical display. As another example, the output device 810 may include an audio device, such as a loudspeaker or headphone. As yet a further example, the output device 810 may include a tactile device, such as a mechanically raiseable device that may, in an example, be configured to display braille or another physical output that may be touched to provide information to a user.

The input device 812 may include any of various devices that enable the computing device 802 to receive control input from users. Examples of suitable input devices 812 that receive human interface inputs may include keyboards, mice, trackballs, touchscreens, microphones, graphics tablets, and the like.

The network devices 808 may each include any of various devices that enable the described components to send and/or receive data from external devices over networks. Examples of suitable network devices 808 include an Ethernet interface, a Wi-Fi transceiver, a cellular transceiver, or a BLUETOOTH or BLE transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for implementing detection and correction of obstruction of vehicle wireless anchor points within a vehicle, comprising:
  characterizing a wireless environment of a cabin of the vehicle using one or more ultra-wideband (UWB) anchors of a phone-as-a-key (PaaK) system of the vehicle, the characterizing including to compute an initial characterization of paths and signal strengths between a transmitter and a receiver of the one or more UWB anchors;

periodically remeasuring the wireless environment to compute an updated characterization of the paths and the signal strengths; and
  responsive to changes in the wireless environment as compared to the initial characterization indicating an impairment of in-cabin presence features, remedying the impairment by switching which of the one or more UWB anchors are used to perform the characterizing.

2. The method of claim 1, further comprising performing a handshake operation between a first UWB anchor of the one or more UWB anchors and a second UWB anchor of the one or more UWB anchors to establish visibility between the one or more UWB anchors for the initial characterization.

3. The method of claim 2, wherein the transmitter and the receiver are implemented as a multiple antenna UWB anchor of the one or more UWB anchors in a roof of the cabin of the vehicle.

4. The method of claim 1, wherein the transmitter is a first UWB anchor of the one or more UWB anchors in a roof of the cabin of the vehicle, and the receiver is a second UWB anchor of the one or more UWB anchors in a different location in the cabin of the vehicle.

5. The method of claim 1, wherein the changes in the wireless environment indicating the impairment include the signal strengths below a minimum threshold signal strength.

6. The method of claim 1, wherein the changes in the wireless environment indicating the impairment include a quantity of the paths being below a minimum threshold quantity of signal paths between the transmitter and the receiver.

7. The method of claim 1, further comprising activating an alarm of the vehicle in responsive to the changes in the wireless environment indicating the impairment of in-cabin presence features.

8. The method of claim 1, further comprising sending an alert to a mobile device of a user of the vehicle in responsive to the changes in the wireless environment indicating the impairment of in-cabin presence features.

9. The method of claim 1, further comprising utilizing the transmitter and the receiver of the one or more UWB anchors for performing the presence features, including one or more of intrusion detection or child presence detection within the cabin.

10. A system for detection and correction of obstruction of vehicle wireless anchor points within a vehicle, comprising:
  one or more UWB anchors of a PaaK system of the vehicle; and
  a controller in communication with the one or more UWB anchors and configured to:
    perform a handshake operation between a first UWB anchor of the one or more UWB anchors and a second UWB anchor of the one or more UWB anchors to establish visibility between the one or more UWB anchors,
    characterize a wireless environment of a cabin of the vehicle using the one or more UWB anchors, the characterization including to compute an initial characterization of paths and signal strengths between a transmitter and a receiver of the one or more UWB anchors,
    periodically remeasure the wireless environment to compute an updated characterization of the paths and the signal strengths, and
    responsive to changes in the wireless environment as compared to the initial characterization indicating an impairment of in-cabin presence features, remedy the impairment by switching which of the one or more UWB anchors are used to perform the characterization.

11. The system of claim 10, wherein the transmitter and the receiver are implemented as a multiple antenna UWB transceiver of the one or more UWB anchors in a roof of the cabin of the vehicle, and wherein the handshake operation is performed between the multiple antenna UWB transceiver at least another one UWB transceiver of the one or more UWB anchors.

12. The system of claim 10, wherein the transmitter is a first UWB transceiver of the one or more UWB anchors in a roof of the cabin of the vehicle, and the receiver is a second UWB transceiver of the one or more UWB anchors in a different location in the cabin of the vehicle.

13. The system of claim 10, wherein the changes in the wireless environment indicating the impairment include the signal strengths below a minimum threshold signal strength.

14. The system of claim 10, wherein the changes in the wireless environment indicating the impairment include a quantity of the paths being below a minimum threshold quantity of signal paths between the transmitter and the receiver.

15. The system of claim 10, wherein the controller is further configured to activate an alarm of the vehicle in responsive to the changes in the wireless environment indicating the impairment of in-cabin presence features.

16. The system of claim 10, wherein the controller is further configured to send an alert to a mobile device of a user of the vehicle in responsive to the changes in the wireless environment indicating the impairment of in-cabin presence features.

17. The system of claim 10, wherein the controller is further configured to utilize the transmitter and the receiver of the one or more UWB anchors for performing the presence features, including one or more of intrusion detection or child presence detection within the cabin.

18. A non-transitory computer-readable medium comprising instructions for detection and correction of obstruction of vehicle wireless anchor points of a PaaK system of a vehicle that, when executed by a controller in communication with one or more UWB transceivers, causes the controller to perform operations including to:

perform a handshake operation between a first UWB transceiver of the one or more UWB transceivers and a second UWB transceiver of the one or more UWB transceivers to establish visibility between the one or more UWB transceivers for an initial characterization of a cabin of the vehicle, utilize a transmitter and a receiver of the one or more UWB transceivers for performing in-cabin presence features, including one or more of intrusion detection or child presence detection within the cabin, characterize a wireless environment of the cabin of the vehicle using one or more UWB transceivers, the characterization including to compute an initial characterization of paths and signal strengths between the transmitter and the receiver of the one or more UWB transceivers, periodically remeasure the wireless environment to compute an updated characterization of the paths and the signal strengths, responsive to changes in the wireless environment as compared to the initial characterization indicating an impairment of the in-cabin presence features, remedy the impairment by switching which of the one or more UWB transceivers are used to perform the characterization.

19. The medium of claim 18, wherein the changes in the wireless environment indicating the impairment include one or more of: the signal strengths below a minimum threshold signal strength, and/or a quantity of the paths being below a minimum threshold quantity of signal paths between the transmitter and the receiver.

20. The medium of claim 18, wherein the controller is further configured to one or more of:

activate an alarm of the vehicle in responsive to the changes in the wireless environment indicating the impairment of in-cabin presence features, and/or send an alert to a mobile device of a user of the vehicle in responsive to the changes in the wireless environment indicating the impairment of in-cabin presence features.

* * * * *